United States Patent [19]
Gifford

[11] Patent Number: 5,968,302
[45] Date of Patent: Oct. 19, 1999

[54] METHODS FOR MANUFACTURING PRECISION FIT FINGERNAILS

[75] Inventor: Craig P. Gifford, West Valley City, Utah

[73] Assignee: OVA Nail Products, Inc., West Valley City, Utah

[21] Appl. No.: 08/868,264

[22] Filed: Jun. 3, 1997

Related U.S. Application Data

[63] Continuation-in-part of application No. 08/857,793, May 16, 1997, abandoned.

[51] Int. Cl.⁶ .................................................. A45D 31/00
[52] U.S. Cl. .......................... 156/245; 264/220; 264/222
[58] Field of Search ..................... 264/220, 222, 264/328.1, 331.11; 156/245; 425/175; 249/54

[56] References Cited

U.S. PATENT DOCUMENTS

| | | |
|---|---|---|
| 3,157,912 | 11/1964 | Lisczawka . |
| 4,150,931 | 4/1979 | Gabrys . |
| 4,202,522 | 5/1980 | Hanas et al. . |
| 4,359,435 | 11/1982 | Kogure . |
| 4,361,160 | 11/1982 | Bryce . |
| 4,718,957 | 1/1988 | Sensenbrenner ........................ 264/220 |
| 4,876,121 | 10/1989 | Cohen . |
| 4,979,523 | 12/1990 | Grimm . |
| 5,147,663 | 9/1992 | Trakas . |
| 5,151,232 | 9/1992 | Thornthwaite et al. ................ 264/222 |
| 5,238,386 | 8/1993 | Cunningham et al. . |
| 5,281,122 | 1/1994 | Langner . |

OTHER PUBLICATIONS

*Skinners Science of Dental Materials*, Ralph W. Phillips, pp. 175–180 (1982).
*Valplast Techniques, Informational Booklet on Valplast Restorations*, Valplast International Corp. (1995).
Success Injection System, Dentsply Brochure (Sep. 1996).

*Primary Examiner*—Jill L. Heitbrink
*Attorney, Agent, or Firm*—Workman, Nydegger & Seeley

[57] ABSTRACT

A method for manufacturing artificial fingernails includes forming a model of a desired artificial fingernail which is then enclosed within an investment material. After the investment material has hardened, the model is removed therefrom to form a negative cast of the desired artificial fingernail. A reciprocating screw injector is then used to inject an acetone resistant thermoplastic material into the negative cast. The thermoplastic material is separated from the investment material in the shape of the desired artificial fingernail. Binding pockets are finally form on the surface of the artificial fingernail for use in attaching the artificial fingernails to the real fingernail by an adhesive.

28 Claims, 8 Drawing Sheets

METHODS FOR MANUFACTURING PRECISION FIT FINGERNAILS

RELATED APPLICATIONS

This application is a continuation-in-part of U.S. patent application Ser. No. 08/857,793 filed May 16, 1997 abandoned, in the name of Craig P. Gifford, D.D.S., for Method for Manufacturing Thermoplastic Dental Prosthesis. For purpose of disclosure, this application is incorporated herein by specific reference.

BACKGROUND OF THE INVENTION

1. The Field of the Invention

The present invention relates to methods for manufacturing artificial fingernails and, more specifically, methods for manufacturing precision fit artificial fingernails.

2. The Relevant Technology

Artificial fingernails typically comprise thin, elongated, plastic structures having a configuration substantially similar to a real fingernail. Through use of an adhesive, the artificial fingernails can be selectively secured to existing fingernails. One of the benefits of artificial fingernails is that they enable a user to selectively have uniform fingernails of a desired thickness, length, and configuration without having to wait for the real fingernails to grow. This is especially useful to those who have weak fingernails that easily crack or break.

There are several different methods for attaching artificial fingernails. In one method, commonly used in fingernail salons, the tail end of an artificial fingernail is attached to the tip of a real finger by an adhesive. A thermoset acrylic is then used to fill in the gap between the cuticle of the finger and the tail end of the artificial fingernail. The acrylic is also used to cover over the artificial fingernail so that a uniform surface extends from the cuticle to the tip of the artificial fingernail. The acrylic overlay is then filed to provide a smooth surface. This process is repeated for each finger. The resulting artificial fingernails can then be painted with a fingernail polish to a desired color.

The above process is time consuming, labor intensive, and requires significant skill so that the resulting artificial fingernails have a uniform and smooth configuration. As the real fingernails grow, a gap is formed between the cuticle and the acrylic. To maintain uniformity of the fingernails, the gap must be repeatedly filled with acrylic after which the artificial fingernail must again be filed smooth and polish reapplied.

Since the fingers cannot breath through the acrylic, it is recommended that the artificial fingernails be removed every couple of weeks to allow the end of fingers to breath. Once the artificial fingernails are removed, however, the entire process must again be repeated. Due to the time and cost of reapplying the artificial fingernails, people will typically leave them on longer than is recommended. Extended wear can be harmful to the fingers and facilitate the growth of nail fungus.

In a second process for attaching artificial fingernails, sets of artificial fingernails are purchased that are designed to completely cover the real fingernails. This configuration avoids the step of having to backfill with an acrylic. However, since human fingers come in an unlimited range of sizes and shapes, it is impractical, if not impossible, to manufacture sets of artificial fingernails that will precisely fit all people. Accordingly, such artificial fingernails are manufactured in standard sets by size and length.

For attachment, each artificial fingernail is first manually trimmed so as to snugly fit around the cuticle of a corresponding finger. The artificial fingernails are also trimmed to a desired length or shape. This process must be repeated for each of the ten fingers. The artificial fingernails are then attached by simply applying an adhesive between the artificial fingernail and the real fingernail. Once attached, each of the artificial fingernails can be painted to a desired color.

Although simpler, this process also has its shortcomings. For example, although the perimeter of the artificial fingernail can be trimmed to fit around the cuticle of the fingernail, artificial fingernails typically have a poor fit between the inside surface of the artificial fingernail and the top surface of the actual fingernail. This is because the real fingernails of each person have a unique arch and a unique surface texture with small ridges or bumps. In contrast, the inside surface of artificial fingernails are smooth having a standard arch configuration. This poor fit between the artificial fingernails and the real fingernails can result in a poor presentation or look of the attached artificial fingernails and can significantly reduce the ability for the adhesive to secure the artificial fingernails to the real fingernails.

Furthermore, should an artificial fingernail crack or break, the process must be repeated for that fingernail. Since artificial fingernails are typically sold in sets, an entire set must be purchased just to replace a single fingernail. Full length artificial fingernails should also be removed every few days to enable the fingers to breath. Removal of the artificial fingernails is typically accomplished by soaking the fingers in acetone. Acetone, however, decomposes both the adhesive and the artificial fingernails. As a result, the artificial fingernails cannot be replaced after they are removed. Rather a new set of artificial fingernails must again be trimmed and fitted using the above process.

OBJECTS AND BRIEF SUMMARY OF THE INVENTION

Accordingly, it is an object of the present invention to provide improved methods for manufacturing artificial fingernails.

Another object of the present invention is to provide improved methods for manufacturing artificial fingernails that have a precision fit both around the cuticle and on the surface of a real fingernail of an intended user.

Yet another object of the present invention is to provide improved methods for manufacturing precision fit artificial fingernails that are relatively inexpensive.

Still another object of the present invention is to provide improved methods for manufacturing precision fit artificial fingernails that do not need to be painted.

Another object of the present invention is to provide improved methods for manufacturing precision fit artificial fingernails that can be easily and quickly attached without assistance.

Finally, another object of the present invention is to provide methods for manufacturing precision fit artificial fingernails that can be repeatedly removed and reapplied.

To achieve the foregoing objectives, and in accordance with the invention as embodied and broadly described herein, a method is provided for manufacturing precision fit artificial fingernails. The method comprises a first step of obtaining a model of an artificial fingernail that has a precise fit. This can be accomplished by first trimming a conventional plastic artificial fingernail so as to fit around the cuticle of an intended user. The inside surface of the artificial fingernail model is next fitted by applying a thermoset acrylic to the portion of the inside surface of the model that will overlie a corresponding real fingernail. The model is then pressed against the top surface of real fingernail such that as the acrylic hardens, the acrylic has the identical configuration of the top surface of the real fingernail. Alternatively, the artificial fingernail model can be sculpted out of wax or other materials.

Once the model is formed, the model is encased by an investment material within the flask. The investment material typically comprises cementitious mixtures or thermoset plastics. A sprue is positioned so as to extend from the model to the exterior of the flask. Once the investment material has hardened, the flask can be separated to remove the model and sprue from the investment material. Removal of the model leaves a negative cast of the desired artificial fingernail. Removal of the sprue leaves a passageway extending from the negative cast to the exterior.

With the flask reassembled, the flask is positioned within the cavity of a die. The die has a fill channel that extends from the passageway in the flask to the exterior of the die. The die is subsequently coupled with a reciprocating screw injector so that the nozzle of the injector is lined up with the fill channel of the die. A plastic material, preferably an acetone resistant thermoplastic material, is then injected from the injector into the fill channel of the die so as to fill the negative cast. Once the negative cast is filled, the die is separated from the injector and the flask removed therefrom. In turn, the artificial fingernail formed within the negative cast is separated from the investment material.

To help secure the artificial fingernail to the real fingernail, binding pockets are formed on a surface of the artificial fingernail that will overlie the real fingernail. Conventional adhesives can then be used to attach the artificial fingernail to the real fingernail.

The inventive process has a number of advantages over conventional methods for manufacturing artificial fingernails. For example, the finished artificial fingernails of the present invention are attached having a precise fit. That is, the artificial fingernails do not have to be trimmed or otherwise fitted prior to attachment. Likewise, using the inventive process, a plurality of sets of artificial fingernails can be simultaneously manufactured. Accordingly, should one crack or break, it would be easy to replace the artificial fingernail since no trimming or fitting is required. Where the artificial fingernail is formed from an acetone resistant material, the fingernail can be repeatedly removed and reapplied. This is in sharp contrast to conventional fingernails which have a single use life. Finally, the inventive fingernails can be formed from a plastic material having a desired color. In this case, the step of having to paint the artificial fingernail with a nail polish is eliminated. Likewise, since the fingernail is the same color all the way through, the color is not removed as a result of scratching or chipping.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
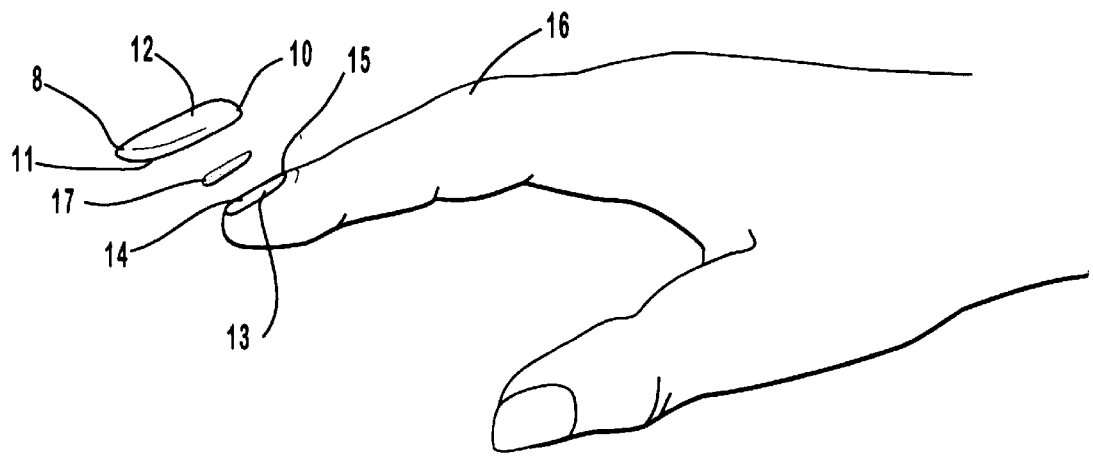
FIG. 1 is a perspective view of a model of an artificial fingernail over a finger having a real fingernail.

The present invention relates to novel methods for manufacturing artificial fingernails. The first step in the method is forming a model of a desired artificial fingernail. Referring to FIG. 1, a model 12 of an artificial fingernail is depicted. Model 12 has a tip end 8, a tail end 10, and an inside surface 11 that extends therebetween. In one embodiment, model 12 comprises a conventional plastic artificial fingernail that is selectively configured so as to precisely fit on real fingernail 14 of finger 16. Real fingernail 14 has a top surface 13 partially bounded by a cuticle 15. The fitting process typically comprises manually trimming tail end 10 of model 12 so as to snugly fit against cuticle 15. Tip end 8 of model 12 is also trimmed to a desired length and shape.

Next, model 12 is fitted to complementary mate with top surface 13 of real fingernail 14. This is accomplished by applying a layer of modeling agent 17 to the portion of the inside surface 11 of model 12 that will overlie real fingernail 14. Preferred modeling agents 17 are thermoset resin, such as an acrylic. Alternatively, modeling agent 17 can comprise wax, clay, or other substrates that can be shaped into a form stable configuration. When acrylic is used, top surface 13 of real fingernail 14 is covered with a petroleum based jelly or other releasing agent. Model 12 having the acrylic thereon is then pressed against top surface 13 of real fingernail 14.

To prevent the acrylic from adhering to real fingernail 14, model 12 can be periodically removed and reapplied. The acrylic that squeezes out from under model 12 should be either wiped off while still wet or sanded off after the acrylic has hardened. Once the acrylic has become form stable, model 12 is placed in hot water for final setting of the acrylic. Model 12 can then subsequently be attached by a light spray adhesive to insure that it properly fits and is in uniform alignment.

In alternative embodiments, model 12 can be completely sculpted from wax or other plastic materials. The important aspect is that mold 12 be formed into a configuration that is substantially identical to the desired configuration for the artificial fingernail to be manufactured.

Figure 2:
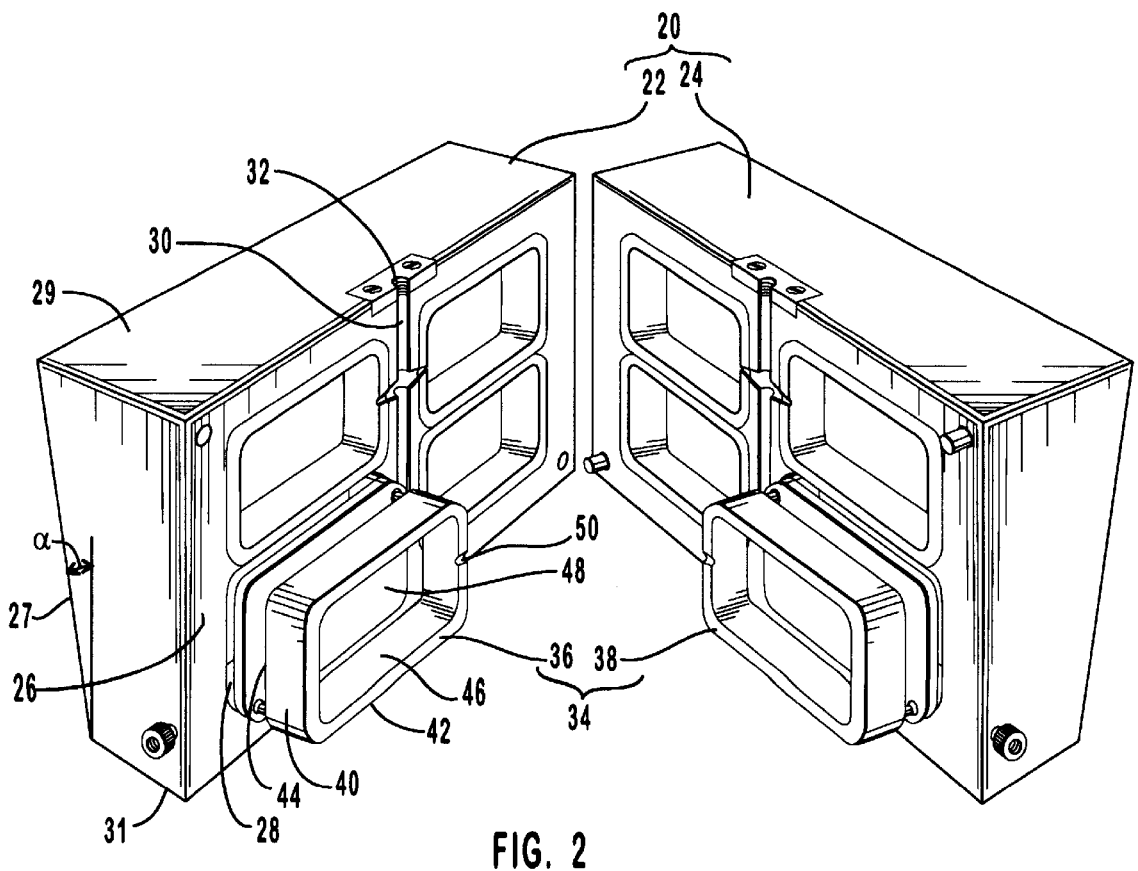
FIG. 2 is a perspective view of a die mold enclosing a plurality of flasks.

Depicted in FIG. 2 is a die 20 comprising a first die half 22 and an opposing second die half 24. Die 20 is preferably made of a high strength metal and has a substantially V-shaped configuration. First die half 22 has an inside face 26, an outside face 27, a top surface 29, and a bottom surface 31. Outside face 27 radially slopes outward from bottom surface 31 to top surface 29 at an angle α in a range between about 5 degrees to about 25 degrees with about 10 degrees to about 20 degrees being more preferred. A plurality of cavities 28 are formed on inside face 26. Each cavity 28 is interconnected by a narrow fill channel 30 which communicates with the exterior through a fill hole 32. Second die half 24 is the mirror image of first die half 22. Accordingly, like structural elements between die halves 22 and 24 are identified by like reference characters.

Removably disposed within each cavity 28 is a flask 34. As with die 20, each flask 28 comprises a first flask half 36 and an opposing second flask half 38. First flask half 36 comprises a sidewall 40 encircling a chamber 46. Sidewall 40 extends from an open first end 42 to an opposing open second end 44. A groove 50 is positioned at first end 42 and communicates with fill channel 30 when first flask half 36 is positioned within cavity 28. Second end 44 is selectively closed by a cap 48. Second flask half 38 is the mirror image of first flask half 36. Accordingly, like structural elements between flask halves 36 and 38 are identified by like reference characters.

When die halves 22 and 24 are coupled together, first ends 42 of flask halves 36 and 38 are complementary mated so that chambers 46 are enclosed. Grooves 50 are likewise aligned to form an aperture that extends from chamber 46 to fill channel 30. In turn, fill channel 30 communicates with the exterior through fill hole 32.

Figure 3:
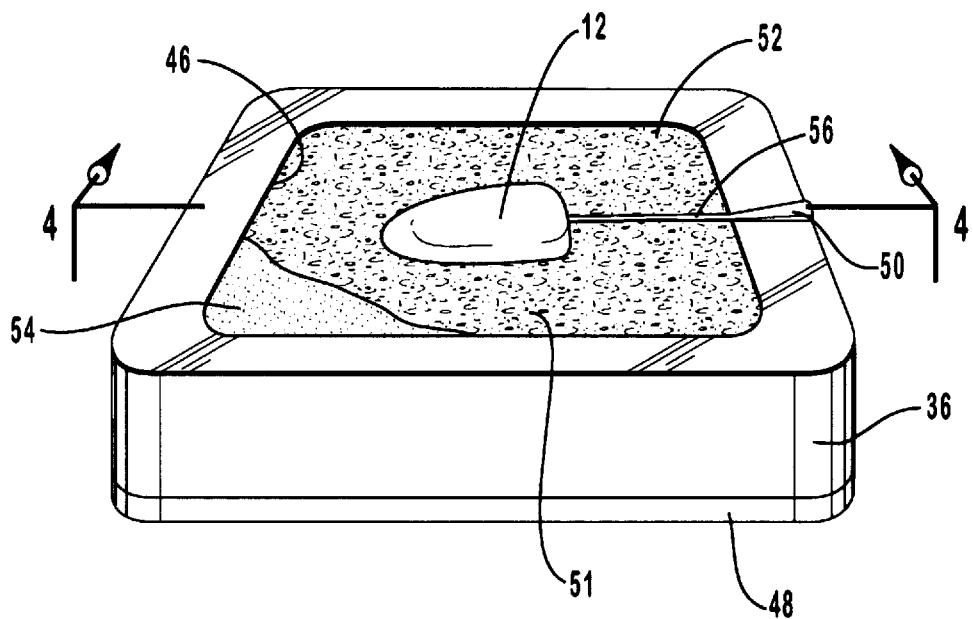
FIG. 3 is a perspective view of the model in FIG. 1 being partially enclosed by an investment material within a flask of FIG. 2.

Once formed, model 12 is positioned within first flask half 36, as depicted in FIG. 3. Chamber 46 is filled with a first layer 51 of an investment material. First layer 51 has an exposed surface 52 on which model 12 is positioned. The investment material includes conventional cementitious mixtures which can be poured in a liquid state and then set to harden. Preferred investment materials include dental stone, plaster, die stone, buff stone, and the like. Alternative investment materials include thermoset plastics such as epoxies. Once the investment material has sufficiently hardened, a separating agent 54 is applied on exposed surface 52. Preferred separating agents include silicone sprays and other conventional mold releasing agents.

Next, a sprue 56 is positioned so as to extend from model 12 to groove 50 in flask half 36. Sprue 56 can be formed from wax or any of the other materials used in conventional lost wax processes. Sprue 56 can also be made from thermoset plastics or can comprise a narrow wire that is secured to model 12.

Figure 4:
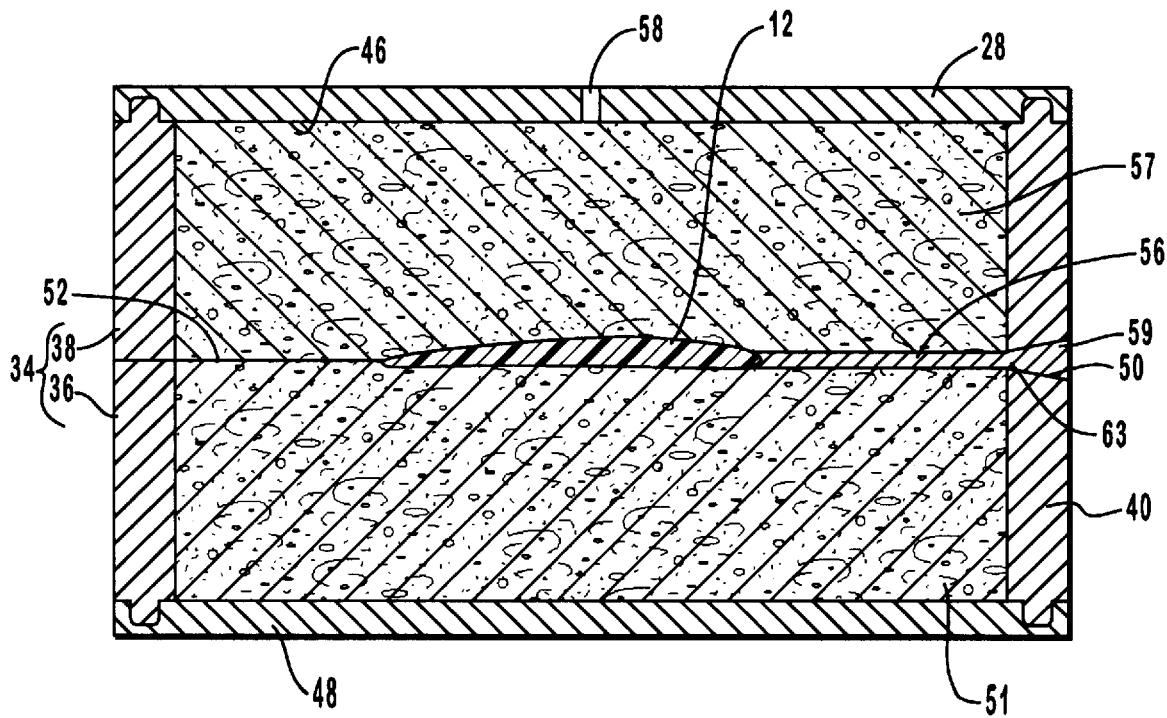
FIG. 4 is a cross-sectional side view of the model in FIG. 3 being enclosed by an investment material within a flask.

As depicted in FIG. 4, once sprue 56 is positioned, flask halves 36 and 38 are coupled together so as to completely enclose model 12 between first layer 51 and a second layer 57 of investment material. Chamber 46 of second flask half 38 can be filled with second layer 57 of investment material in a variety of different ways. For example, second layer 57 can be positioned within chamber 46 prior to coupling flask halves 36 and 38 together. Alternatively, flask halves 36 and 38 can first be coupled. Next, cap 28 of second flask half 38 is removed to allow filling of the chamber 46 with investment material. As cap 28 is replaced, excess material flows out through a port 58 extending through cap 28.

FIG. 4 clearly depicts that aligned grooves 50 form an aperture 59 that extends through sidewall 40 of flask 34. Aperture 59 radially, inwardly constricts to a narrow gate 63. The purpose of gate 63 will be discussed later in greater detail.

Figure 5:
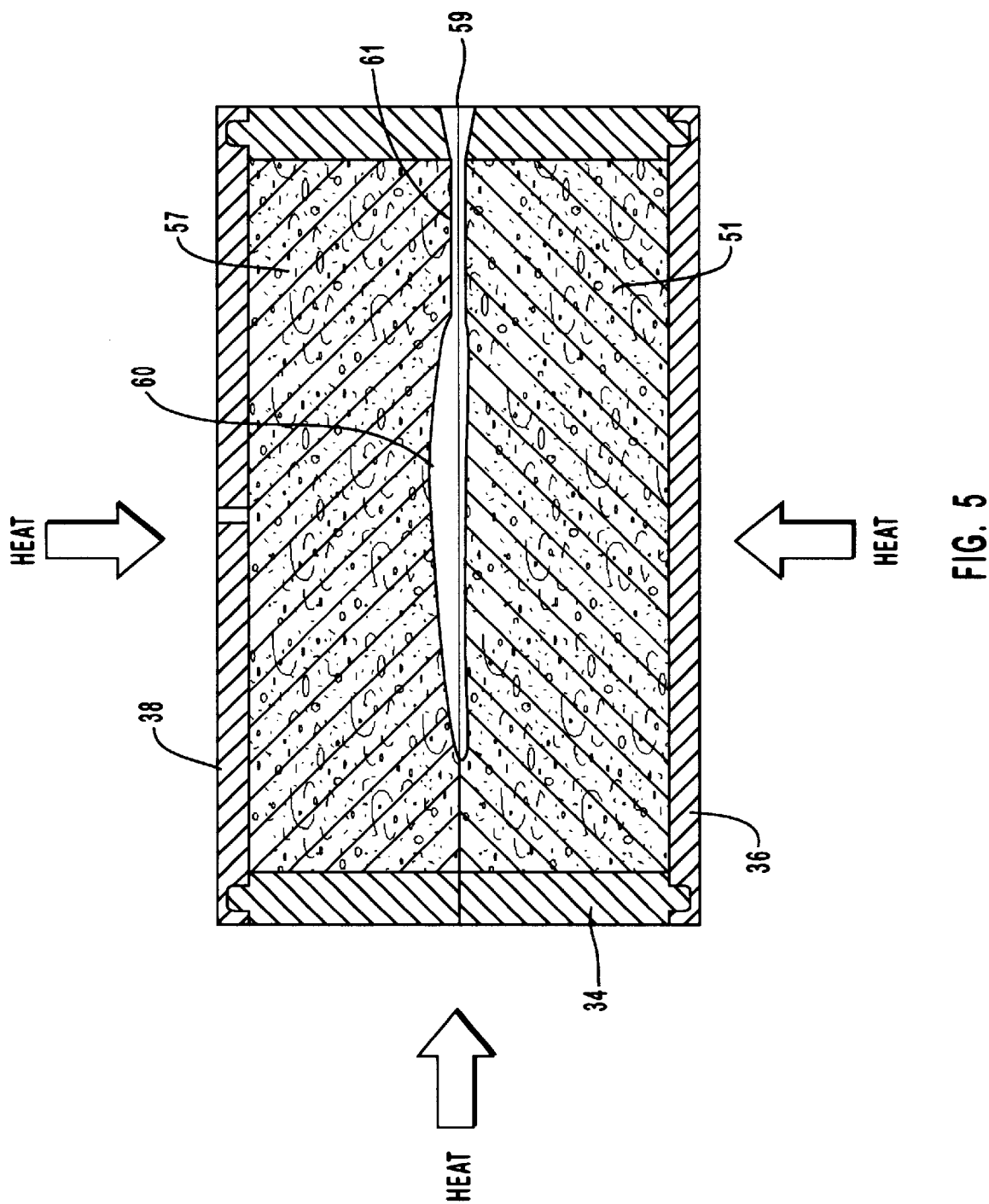
FIG. 5 is a cross-sectional side view of the flask in FIG. 4 having the model removed therefrom.

Once second layer 57 of investment material has sufficiently hardened, model 12 and sprue 56 are removed. This step can be accomplished in a variety of different ways and is largely dependent upon the materials from which model 12 and sprue 56 are made. For example, where model 12 and sprue 56 are made of wax, the entire flask 34, as depicted in FIG. 5, can be heated, such as in an oven or heated water so as to melt and remove the wax material through aperture 59. The space previously occupied by model 12 forms a negative cast 60 of the desired artificial fingernail. Likewise, the space previously occupied by sprue 56 forms a passageway 61 that extends from negative cast 60 to aperture 59.

In alternative methods for removing model 12 and sprue 56, flask halves 36 and 38 can be separated to allow manual removal of the model 12 and sprue 56. Separated flask halves 36 and 38 can also be heated. Likewise, where applicable, acids or other solvents, such as acetone, can be placed on separated flask halves 36 and 38 for dissolving or otherwise removing model 12 and sprue 56.

Once model 12 and sprue 56 are completely removed, separating agent 54 can be applied across the exposed faces of first and second layers 51 and 57 and within negative cast 60 and passageway 61. Where the investment material comprises a cementitious material, such as dental stone or plaster, negative cast 60 and passageway 61 can be coated with a thermoset material. The thermoset material smooths the surface of the investment material, thereby producing a final product that is easier to remove from the investment material and has a smoother finish. To maintain the precision fit of the resulting artificial fingernails, however, it may be necessary to first slightly enlarge negative cast 60 prior to applying the thermoset material. Flask halves 36 and 38 can then be reassembled, as shown in FIG. 5.

Figure 6:
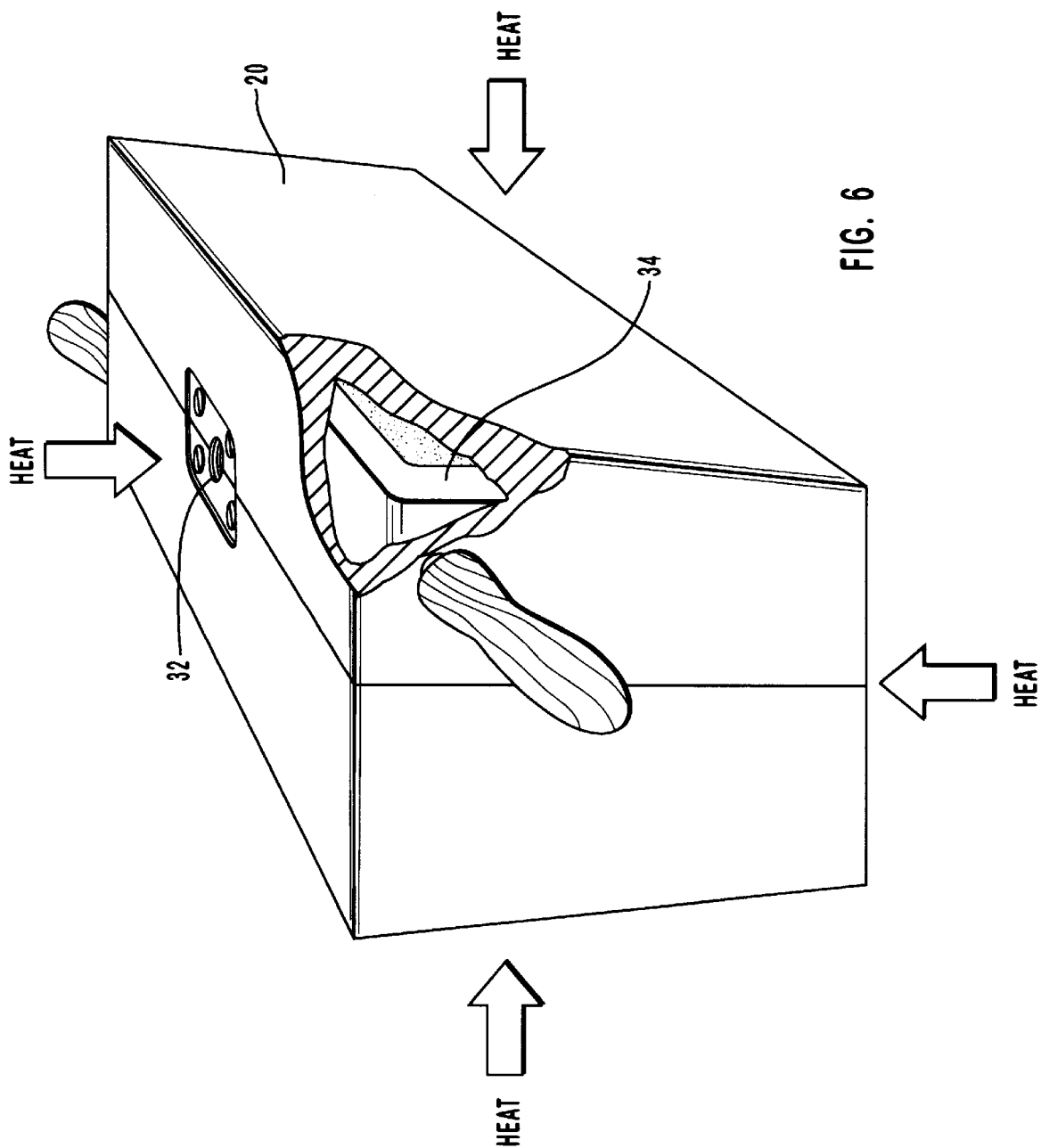
FIG. 6 is a partially cut away perspective view of the flask of FIG. 5 being positioned within the die of FIG. 2 and heated.

Next, flask 34 is positioned within cavity 28 of die 20 and die halves 22 and 24 are assembled together as depicted in FIG. 6. In this position, fill hole 32 communicates with negative cast 60 through passageway 61 and fill channel 30. For reasons that will be discussed later, in one method for manufacture, die 20 having flask 34 contained therein is heated to a temperature preferably in a range between about 65° C. to about 120° C. with about 75° C. to about 100° C. being preferred. Such heating of die 20 is typically accomplished in an oven.

Figure 7:
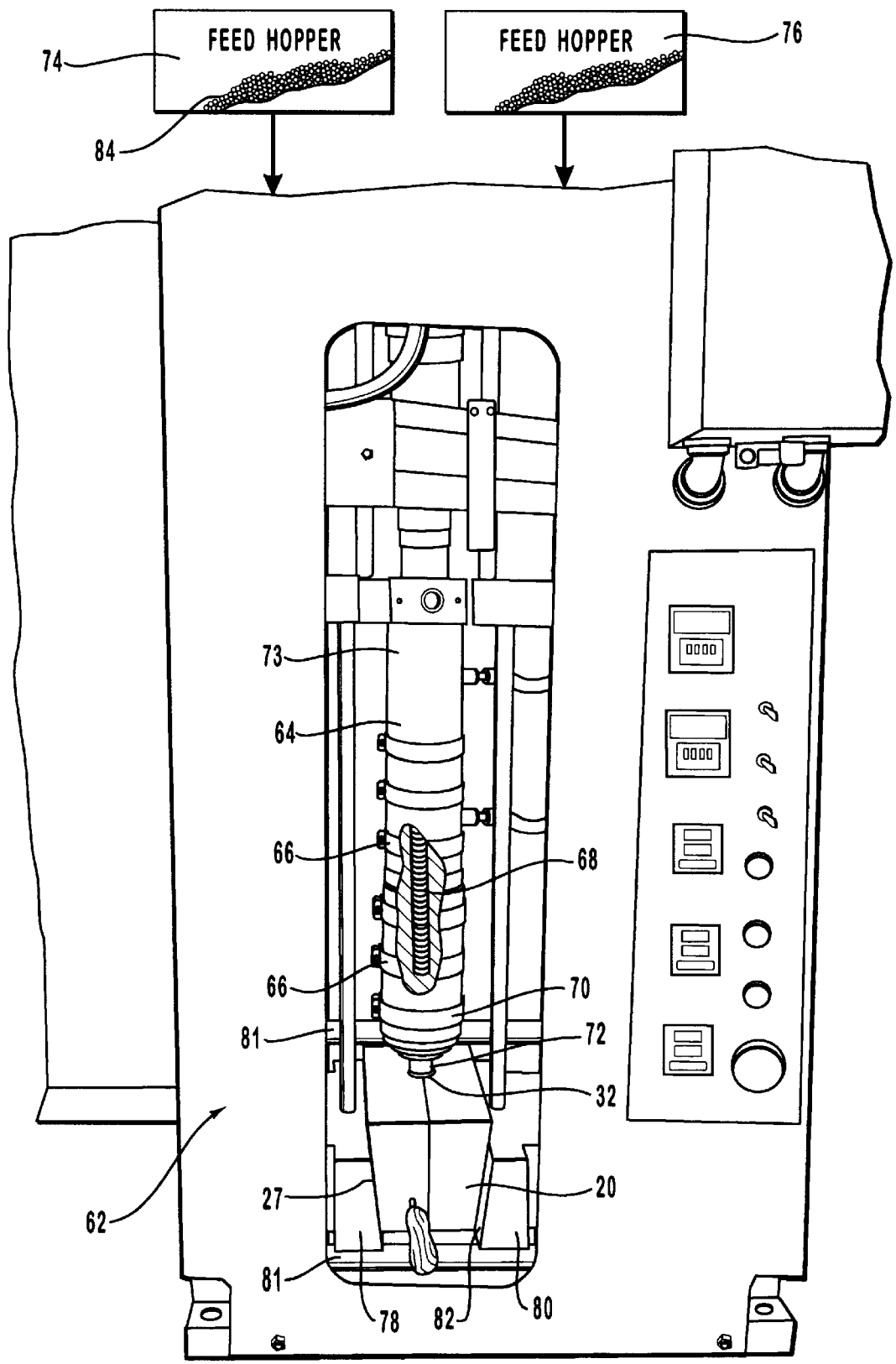
FIG. 7 is a perspective view of the die from FIG. 6 being positioned within a reciprocating screw injector.

With die 20 heated, die 20 is coupled to an injection machine 62. As depicted in FIG. 7, one embodiment of injection machine 62 comprises a barrel 64 having a plurality of heating elements 66 attached thereto. Longitudinally disposed within barrel 64 is a reciprocating screw 68. Positioned at a first end 70 of barrel 64 is a nozzle 72. Coupled with second end 73 of barrel 64 is a first hopper 74 and a second hopper 76. Injection machine 62 also includes a pair of clamping shoes 78 and 80. Each clamping shoe has a face 82 that is sloped complementary to outside face 27 of each die half 22 and 24.

Die 20 is wedged between clamping shoes 78 and 80 so that fill hole 32 on die 20 is coupled with nozzle 72. Injection machine 62 preferably comprises a reciprocating screw injector. One preferred reciprocating screw injector is Model #55 of the "Wasp" series of machines available from Mini-Injector Machinery Corporation out of Newbury, Ohio. Conventional industrial strength reciprocating screw injectors can also be used. Injection machine 62 also includes conventional plunger machines. One example of a plunger machine comprises Model #50 of the "Wasp" series of machines available from Mini-Injector Machinery Corporation out of Newbury, Ohio.

Injection machine 62 is used to inject a plastic material, either a thermoset plastic or a thermoplastic material, into negative cast 60. As used in the specification and appended claims, the term "thermoplastic material" means materials that become flowable upon the application of sufficient heat and/or pressure but which set as solids, while maintaining their original chemical composition, upon removal of the applied heat and/or pressure. By way of example and not by limitation, ABS plastics, acetals, acrylics, cellulosics, ionomers, nylons, polyethylenes, polycarbonates, and polystyrene are thermoplastic materials. Fillers, such as glass and fibers, can be added to the thermoplastic materials to selectively vary their properties. The present invention also uses USP Class 6 medical grade thermoplastic materials. Medical grade thermoplastic materials include MACROLON®, available from the Bear Corporation; CALIBRI® and ISOPLAST®, available from Dow Corning; and LEXAN®, available from General Electric. Preferably, the present invention uses thermoplastic materials that are resistant to acetone. There are a variety of different types of acetals, nylons, polyethylenes, and polypropylenes that are resistant to acetone. Specific examples include ZYTELL® which is a nylon and DELRIN® acetol resin which is an acetal, both of which are available from Dupont. The thermoplastic materials of the present invention typically have a durometer hardness based on a Shore A scale in a range between about 50 to about 120, with about 70 to about 120 being preferred, and about 80 to about 120 being most preferred.

Some thermoplastic materials absorb moisture. To improve the injection capability of such materials, it is helpful to first dehumidify the materials. This is typically accomplished by heating the thermoplastic material to drive off the moisture. The heating can be done either directly within the hopper or prior to positioning the material within the hopper. For example, select polycarbonates can be dehumidified at a temperature in a range between about 70° C. to about 110° C. for between about 4 hours to about 6 hours.

During manufacture, pellets 84, or some other form of a plastic material, are positioned within first hopper 74. Pellets 84 flow into second end 73 of barrel 64. As screw 68 rotates, pellets 84 are picked up by the flights of screw 68 and fed toward first end 70. This action is similar to a meat grinder. Pellets 84 are heated and melted as they advance through barrel 64. Melting of pellets 84 occurs as a result of heating elements 66 and as a result of the pressure and friction produced by reciprocating screw 68. Pellets 84 of thermoplastic materials are typically heated within barrel 64 to a temperature in a range between about 170° C. to about 500° C. with about 250° C. to about 500° C. being preferred, and about 320° C. to about 450° C. being more preferred. Thermoset materials can usually be heated at lower temperatures. The actual temperature is dependent on the specific plastic material being used. Pellets 84 are typically compressed within barrel 64 at a pressure in a range between about 10,000 psi to about 22,000 psi, with about 13,000 psi to about 22,000 psi being preferred, and about 16,000 psi to about 22,000 psi being more preferred.

When screw 68 has prepared enough melted plastic material, screw 68 stops rotating. Screw 68 is then pushed forward, forcing the melted plastic material out of nozzle 72 and into fill hole 32 of die 20. The melted plastic material travels within fill channel 30 and passageway 61 of flask 34 so as to fill negative cast 60. Volatiles developed from heating the plastic material and the air trapped within die 20 are expelled though vents (not shown) extending from cavity 28 to the exterior. As previously discussed, die 20 can be heated prior to injecting the plastic material. Heating of die 20 improves the flow of the material when relatively viscous plastic materials are used. Heating of die 20, however, is not necessary.

Clamping shoes 78 and 80 are held in position by a pair of tie rods 81 that span therebetween. Prior to injecting the melted plastic material into die 20, nozzle 72 is pressed against die 20, thereby wedging die 20 in the slot between clamping shoes 78 and 80. As a result of the complementary angled faces, the force applied by nozzle 72 slightly stretches tie rods 81 creating a tension therein that securely clamps die 20 between shoes 78 and 80.

When the melted plastic material is injected into die 20, the pressure force created by the plastic material is amplified by what is termed the "projected area." The projected area corresponds to the area within die 20 that is filled with the thermoplastic material. The resulting injection force is proportional to the pressure of the melted plastic material times the projected area. This injection force attempts to push die halves 22 and 24 apart during injection, which would cause the plastic to "flash" out between die halves 22 and 24.

Countering the injection force is a clamping pressure. In the present case, the clamping pressure results from tie rods 81 holding clamping shoes 78 and 80 tightly against die 20 until the injection is completed. This clamping pressure is measured in tons, which capacity is dependent on the type of machine used. Due to the varying viscosities of the various plastic resins, the actual pressure within die 20 is difficult to calculate. A good rule of thumb is to have 2 tons of clamping pressure for every square inch of mold projected area. For low viscosity materials such as nylon or high melt index polyethylene, at least 3 tons is recommended. Injection machines of the present invention can typically withstand a clamping pressure greater than about 4 tons, with greater than about 6 tons being preferred, and greater than about 8 tons being more preferred.

The use of clamping shoes 78 and 80 in conjunction with tie rods 81 is only one method for producing the required clamping pressure. The benefit of this configuration is that it minimizes the size of the injection machine. In alternative embodiments, rather than clamping shoes 78 and 80 being held in position by fixed ties 81, one or both of the shoes 78 and 80 can be connected to a hydraulic or mechanical piston that selectively clamps die 20 between the shoes and then releases die 20 after the injection is finished.

Gate 63 formed in flask 34, as previously discussed with regard to FIG. 4, narrows the pathway through which the plastic material flows as it travels to negative cast 60. As a result of gate 63 forming a narrow opening, gate 63 is one of the locations at which the plastic material fist begins to set. By the material setting at gate 63, the material within negative cast 60 is blocked from flowing back into fill channel 30. Back flow of material out of negative cast 60 can decrease the density and structural integrity of the final product.

One unique benefit of using a thermoplastic material is the quickness in which the configured thermoplastic material sets. That is, the thermoplastic material is sufficiently hard to be removed from within negative cast 60 in a time range from about 2 seconds to about 5 minutes, with about 4 seconds to about 60 seconds being preferred, and about 5 seconds to about 15 seconds being more preferred from the time that negative cast 60 is filled with the thermoplastic material. In one embodiment, water channels can be formed in die 20. Water channels can be used for regulating the temperature of die 20. Typically, the water channels are used to run cold water through die 20 so as to shorten the set time of the plastic material.

Figure 8:
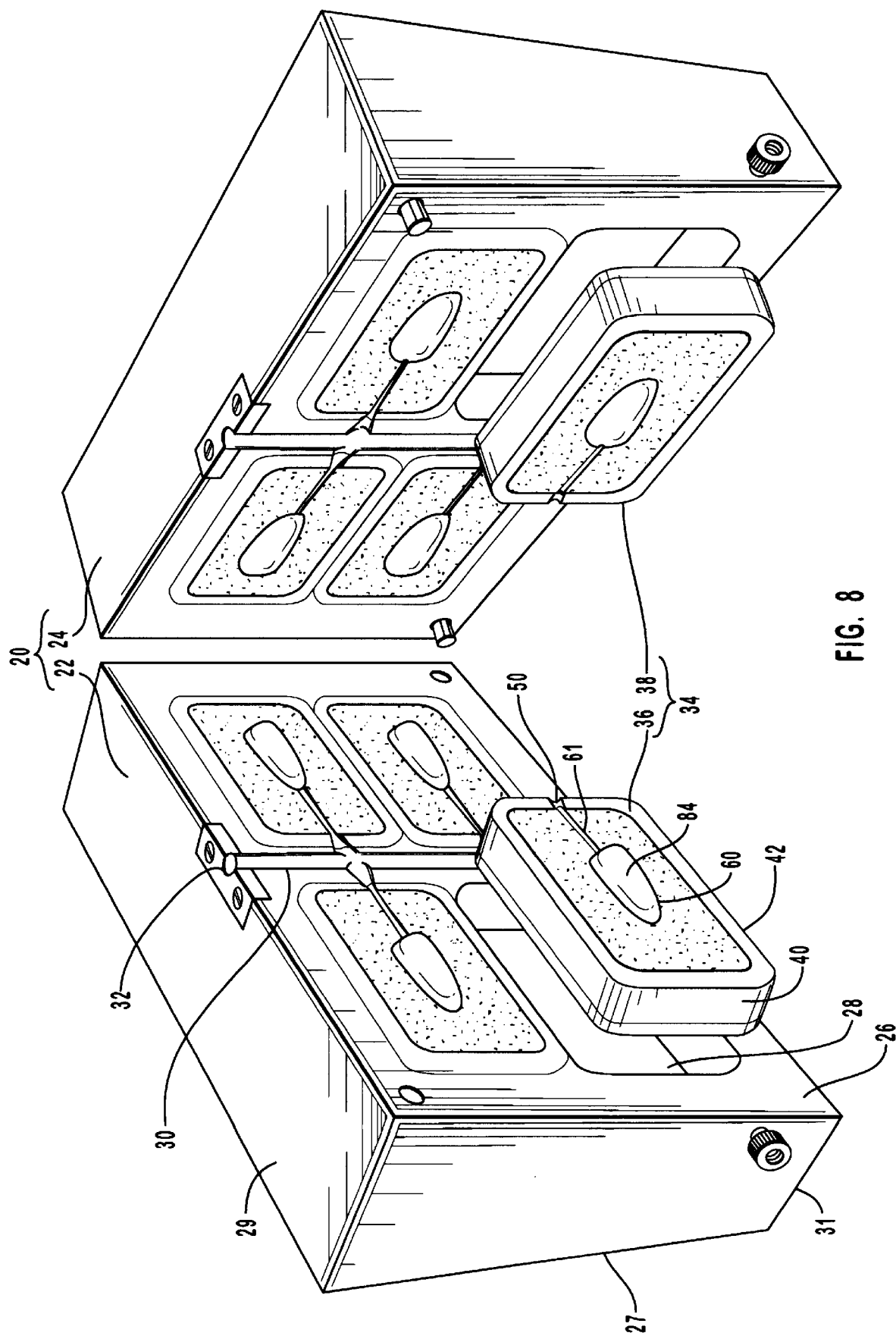
FIG. 8 is a perspective view of the die in FIG. 7 being opened after a plastic material has been injected into the die to form artificial fingernails.

Once the plastic material has set, as depicted in FIG. 8, die 20 can be removed from injection machine 62 and separated. In turn, flask 34 can be removed from within die 20 and likewise separated. As shown therein, the plastic material has filled negative cast 60 to form a plastic artificial fingernail 84 having the same configuration as model 12. Artificial fingernail 84 is next separated from the thermoplastic material within passageway 61 and the surrounding investment material. Where the investment material comprises a thermoset plastic, solvents such as acetone or ethylene glycol, depending on the type of thermoset plastic, can be used to soften the thermoset plastic for easy removal of artificial fingernail 84.

Figure 9:
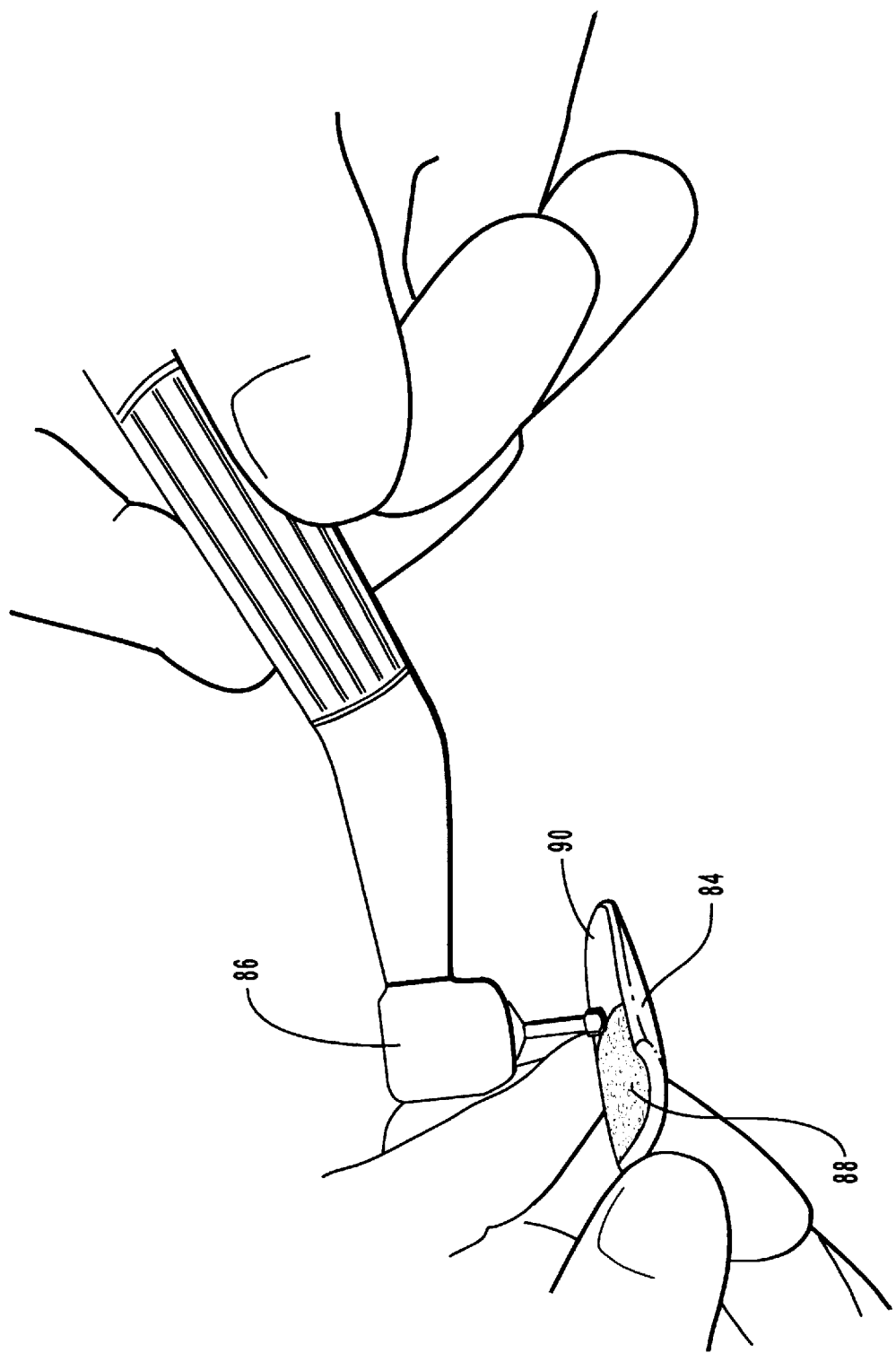
FIG. 9 is perspective view of the artificial fingernail of FIG. 8 having binding pockets formed thereon.

Once artificial fingernail 84 is removed, artificial fingernail 84 can be attached with a precision fit to real fingernail 14 by an adhesive such as a cyanoacrylate adhesive. Where artificial fingernail 84 is formed from an acetone resistant plastic, the formation of binding pockets on artificial fingernail 84 helps to secure the adhesive to artificial fingernail 84. FIG. 9 depicts the use of a drill 86 to form binding pockets 88 on an inner surface 90 of artificial fingernail 84. Of course, binding pockets 88 need only be formed on the portion of inner surface 90 that will overlay real fingernail 14. As used in the specification and appended claims, the term "binding pockets" includes recesses, trenches, cuts, slots, pitting, sanding or any other sharp irregularities which enables an adhesive to securely bind to artificial fingernail 84. Binding pockets 88 can be made from a variety of different tools such as small sand blasters, knives, sand paper or the like.

There are a variety of different ways to color artificial fingernail 84. For example, pellets 84 can be translucent so that the artificial fingernails have the appearance of real fingernails when attached. Conventional fingernail polish can then be used to color artificial fingernail 84. Where artificial fingernail 84 is formed from an acetone resistant material, it may be useful to first lightly roughen the surface of artificial fingernail 84 so as to assist the polish in binding thereto. Alternatively, the surface of artificial fingernail 84 could first be coated with an adhesive over which the fingernail polish is subsequently applied.

Figure 10:
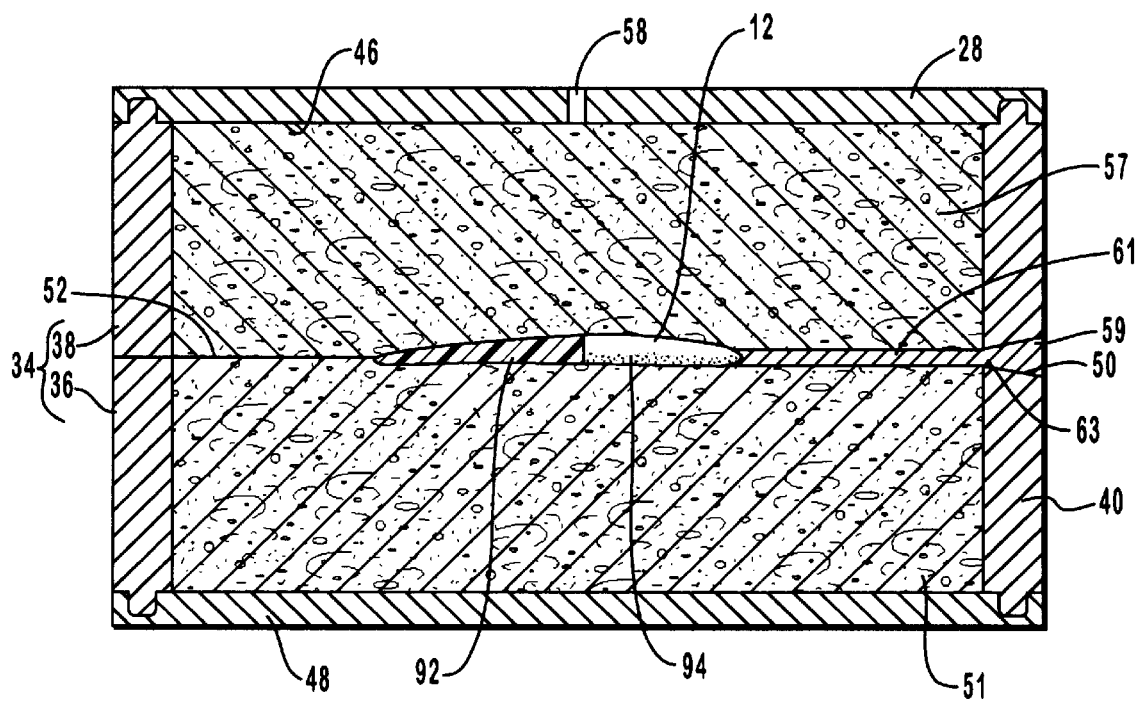
FIG. 10 is a cross-sectional side view of the flask shown in FIG. 4, having a portion of the artificial fingernail from FIG. 8 disposed therein.

Alternatively, pellets 84 can be purchased in a variety of different colors and different sheens. For example, pellets 84 could be purchased in a high gloss red so that the resulting artificial fingernail 84 would not need to be painted. Nevertheless, even thought artificial fingernail 84 is a defined color, artificial fingernail 84 can still be painted, if desired, to change the color. To selectively vary the color so as to obtain artificial fingernail 84 having a desired color, plastic pellets of a select color or color concentrates, pigments or the like can be positioned within second hopper 76. By varying the rate at which the materials from hoppers 74 and 76 feed into barrel 64 for mixing by screw 68, the final color of the material discharging from nozzle 72 can selectively varied.

Where it is desirable to have artificial fingernail 84 having a two part color, such as in a French manicure, the initially formed artificial fingernail 84, as depicted in FIG. 8, is removed from the investment material. A select portion of the artificial fingernail is then cut away. The remaining artificial fingernail 92, as depicted in FIG. 10, is then positioned back into negative cast 60. A plastic material of a second color is then injected into negative cast 60. The injected plastic binds with remaining artificial fingernail 92 to produce artificial fingernails having a two part color. In yet another alternative, a coloring agent 94, such as pigment or color concentrate, can be directly positioned within negative cast 60 as shown in FIG. 10. The plastic material combines with the pigment or color concentrate as the plastic material is injected into negative cast 60, thereby forming artificial fingernail 84 of a desired color.

Figure 11:
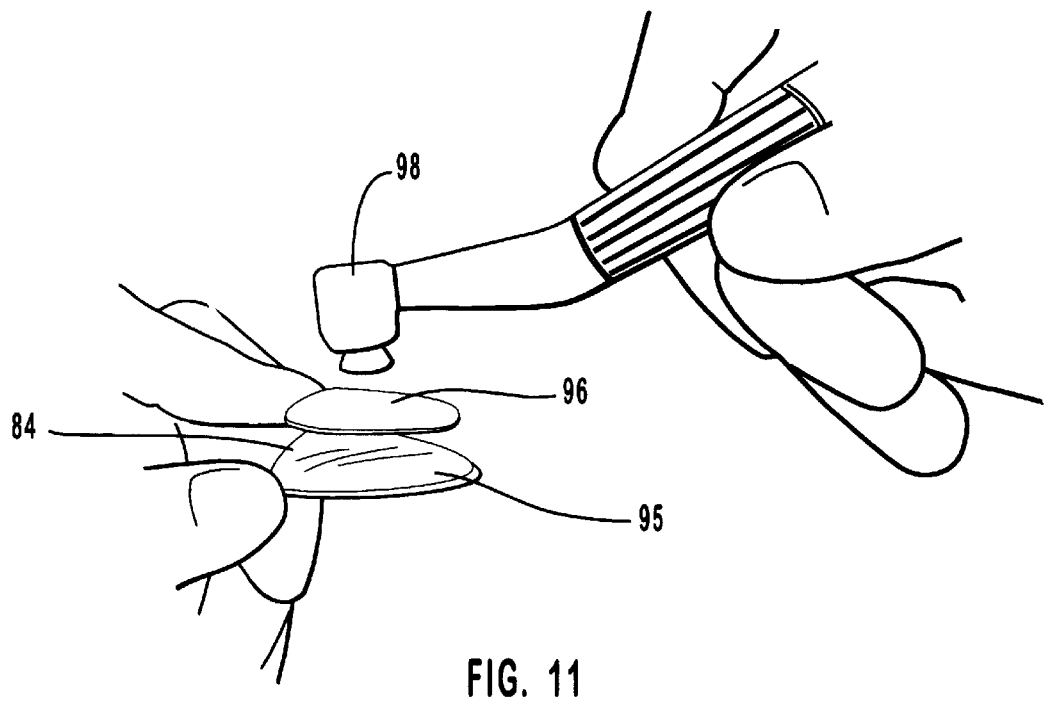
FIG. 11 is a perspective view of the artificial fingernail from FIG. 8 having a colored film layer ultrasonically welded thereto.

In yet another embodiment, as depicted in FIG. 11, a thin film layer 96 of thermoplastic material having a desired color can be ultrasonically welded over top surface 95 of artificial fingernail 84. Layer 96 can be purchased in bulk rolls in desired colors. Layer 96 is first cut to fit over all or a portion of top surface 95 of artificial fingernail 84. Next, an ultrasonic welder 98, typically operating in a range between about 20 to about 40 kilohertz, is used, ultrasonically weld or fuse layer 96 to top surface 95 of artificial fingernail 84.

Die 20 in FIG. 8 is configured to receive a plurality of flasks 34 so as to illustrate one embodiment in which the inventive method can be used for cost effectively mass producing artificial fingernails. That is, it would be both cheeper and quicker to simultaneously inject the plastic material into four discrete negative casts of a desired artificial fingernail. Alternatively, the inventive process works equally well if die 20 has only a single cavity 28 in which a single flask 34 is position. Furthermore, it is also noted that flask 34 is not necessary for the inventive process. Model 12 can be incased in investment material directly within cavity 28 of die 20. Die 20 can then be separated to remove model 12 and sprue 56. The process would then continue as discussed above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for manufacturing an artificial fingernail for attachment to the surface of a real fingernail, the method comprising the steps of:
  (a) applying a modeling agent to an inside face of a discrete model fingernail;
  (b) pressing the modeling agent positioned on the inside face of the model fingernail against the surface of the real fingernail such that the modeling agent forms a substantially identical complementary mold of the surface of the real fingernail;
  (c) enclosing the model fingernail having the modeling agent thereon within an investment material;
  (d) removing the model fingernail and modeling agent from the investment material such that a negative cast of the model fingernail and modeling agent is formed within the investment material;
  (e) injecting a plastic material through a passageway into the negative cast; and
  (f) separating the plastic material injected within the negative cast from the investment material, thereby forming the artificial fingernail.

2. A method as recited in claim 1, further comprising the step of trimming a tail end of the model fingernail so that the tail end of the model fingernail snugly fits against the cuticle of the real finger prior to applying the modeling agent.

3. A method as recited in claim 1, wherein the modeling agent is acrylic.

4. A method as recited in claim 1, further comprising the step of securing the formed artificial fingernail to the real fingernail using cyanoacrylate.

5. A method as recited in claim 1, wherein the step of applying a modeling agent comprises applying a modeling agent to an inside face of a plastic model fingernail.

6. A method as recited in claim 1, wherein the step of injecting the plastic material comprises injecting a thermoplastic material.

7. A method as recite in claim 6, wherein the step of injecting the thermoplastic material comprises:
 (a) housing the investment material within the cavity of a die;
 (b) connecting the nozzle of a reciprocating screw injector to the passageway extending to the negative cast; and
 (c) dispensing the thermoplastic material from the reciprocating screw injector into the negative cast.

8. A method as recited in claim 7, wherein the step of housing the investment material comprises:
 (a) positioning the investment material within a flask; and
 (b) placing the flask within the cavity of the die.

9. A method as recited in claim 7, wherein the step of injecting comprises the thermoplastic material being acetone resistant.

10. A method as recited in claim 9, wherein the thermoplastic material is an acetal.

11. A method as recited in claim 1, further comprising:
 (a) cutting off a portion of the artificial fingernail separated from the investment material;
 (b) positioning the artificial fingernail remaining back into the negative cast; and
 (c) injecting a second thermoplastic material into the negative cast.

12. A method as recited in claim 1, further comprising the step of positioning a coloring agent into the negative cast prior to injecting the plastic material therein.

13. A method as recited in claim 1, further comprising the step of ultrasonically welding a film layer of thermoplastic material onto the artificial fingernail.

14. A method for manufacturing a precision fit, artificial fingernail for the attachment to an exposed top surface of a specific real finger, the method comprising the steps of:
 preparing a model of an artificial fingernail having at least a portion of an interior surface configured substantially identical in complement to the exposed top surface of the real fingernail:
 enclosing the model within an investment material;
 removing the model from within the investment material to form a negative cast of the desired artificial fingernail within the investment material, a passageway extending from the negative cast to the exterior;
 injecting an acetal plastic material into the negative cast; and
 separating the hardened acetal plastic material injected within the negative cast from the investment material, thereby forming the artificial fingernail having a precision fit.

15. A method as recited in claim 14, further comprising the step of forming binding pockets on the surface of the artificial fingernail.

16. A method as recited in claim 14, wherein the step of preparing a model comprises:
 applying a modeling agent to an inside face of a plastic fingernail; and
 pressing the modeling agent positioned on the inside face of the plastic fingernail against the top surface of the real fingernail such that the modeling agent forms a negative mold of the top surface of the real fingernail.

17. A method as recited in claim 16, wherein the step of applying a modeling agent comprises applying an acrylic resin to the inside face of the plastic fingernail.

18. A method as recited in claim 14, wherein the step of injecting the plastic material includes coupling a reciprocating screw injector to the passageway extending through the investment material.

19. A method as recited in claim 14, wherein the step of injecting the plastic material includes coupling a plunger machine to the passageway extending through the investment material.

20. A method as recited in claim 14, wherein the step of injecting the plastic material comprises the plastic material being sufficiently form stable for removal from the negative cast in a time range from about 5 second to about 1 minute after being injected into the negative cast.

21. A method as recited in claim 14, wherein the step of injecting the plastic material comprises the plastic material being sufficiently form stable for removal from the negative cast in a time range from about 5 second to about 30 seconds after being injected into the negative cast.

22. A method as recited in claim 14, further comprising the step of positioning a coloring agent within the negative cast prior to injecting the plastic material therein.

23. A method as recited in claim 14, further comprising the steps of
 (a) cutting off a portion of the artificial fingernail separated from the investment material;
 (b) inserting the artificial fingernail back into the negative cast; and
 (c) injecting a plastic material of a second color into the negative cast.

24. A method as recited in claim 14, wherein the step of enclosing the model includes the investment material comprising a cementitious material.

25. A method as recited in claim 14, wherein the step of enclosing the model includes the investment material comprising a thermoset material.

26. A method for manufacturing an artificial fingernail for attachment to the top surface of a specific real fingernail, the method comprising the steps of:
 (a) applying acrylic to an inside face of a plastic fingernail;
 (b) pressing the acrylic positioned on the inside face of the plastic fingernail against the surface of the real fingernail;
 (c) allowing the acrylic to set such that the acrylic bonds to the plastic fingernail and forms a substantially identical negative mold of the top surface of the real fingernail;
 (d) enclosing the plastic fingernail having the acrylic thereon within an investment material;
 (e) removing the plastic fingernail and acrylic from the investment material such that a negative cast of the plastic fingernail and acrylic is formed within the investment material;
 (f) injecting a thermoplastic material through a passageway into the negative cast; and (g) separating the thermoplastic material injected within the negative cast from the investment material, thereby forming the artificial fingernail.

27. A method as recited in claim 26, wherein the step of injecting a thermoplastic material comprises injecting an acetal.

28. A method as recited in claim 26, further comprising the step of securing the artificial fingernail to the top surface of the specific real fingernail with cyanoacrylate.

* * * * *

UNITED STATES PATENT AND TRADEMARK OFFICE
CERTIFICATE OF CORRECTION

PATENT NO. : 5,968,302
DATED : Oct. 19, 1999
INVENTOR(S) : Craig P. Gifford

It is certified that error appears in the above-identified patent and that said Letters Patent is hereby corrected as shown below:

Cover Page, Abstract, right column, line 10, after "finally" change "form" to --formed--

Col. 5, line 20, after "flask" change "28" to --34--

Col. 8, line 4, after "expelled" change "though" to --through--

Col. 10, line 30, after "is" change "position" to --positioned--

Col. 12, lines 23 and 28, after "5" change "second" to --seconds--

Signed and Sealed this

Twenty-sixth Day of December, 2000

Attest:

Q. TODD DICKINSON

*Attesting Officer*      *Director of Patents and Trademarks*